United States Patent
Wang et al.

(10) Patent No.: US 10,325,394 B2
(45) Date of Patent: **\*Jun. 18, 2019**

(54) MOBILE COMMUNICATION TERMINAL AND DATA INPUT METHOD

(71) Applicant: Apple Inc., Cupertino, CA (US)

(72) Inventors: Sung-Sik Wang, Seoul (KR);
Yong-Hoon Cho, Seoul (KR);
Hoo-Doek Lee, Seoul (KR)

(73) Assignee: Apple Inc., Cupertino, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/956,111

(22) Filed: Apr. 18, 2018

(65) Prior Publication Data

US 2018/0232927 A1    Aug. 16, 2018

Related U.S. Application Data

(63) Continuation of application No. 14/921,414, filed on Oct. 23, 2015, now Pat. No. 9,965,878, which is a (Continued)

(30) Foreign Application Priority Data

Jun. 11, 2008    (KR) .................. 10-2008-0054445
Oct. 21, 2008    (KR) .................. 10-2008-0103080

(51) Int. Cl.
*G06T 11/60*    (2006.01)
*G06F 17/24*    (2006.01)
(Continued)

(52) U.S. Cl.
CPC ............ *G06T 11/60* (2013.01); *G06F 3/0416* (2013.01); *G06F 3/0488* (2013.01);
(Continued)

(58) Field of Classification Search
CPC ........................................................ G06T 11/60
(Continued)

(56) References Cited

U.S. PATENT DOCUMENTS 5,672,107 A    9/1997    Clayman
6,125,284 A    9/2000    Moore et al.
(Continued)

FOREIGN PATENT DOCUMENTS

CN       1330303 A    1/2002
CN     102812446 A   12/2012
(Continued)

OTHER PUBLICATIONS

Notice of Acceptance received for Australian Patent Application No. 2018204025, dated Jul. 10, 2018, 3 pages.
(Continued)

*Primary Examiner* — Joel Ajayi
(74) *Attorney, Agent, or Firm* — Dentons US LLP

(57) ABSTRACT

A communication terminal includes a transceiver to receive first touch information from a counterpart terminal, the first touch information having coordinate information of a touch input inputted by a user of the counterpart terminal, the coordinate information being identified based on a coordinate of the touch input on an image displayed on the counterpart terminal. An image signal processor of the communication terminal controls the first touch information to be displayed on a display of the communication terminal, and controls image information corresponding to the image displayed on the counterpart terminal to be displayed on the display in association with the first touch information, and controls the first touch information to be displayed on the image information.

21 Claims, 12 Drawing Sheets

Related U.S. Application Data continuation of application No. 14/058,901, filed on Oct. 21, 2013, now Pat. No. 9,172,906, which is a continuation of application No. 12/466,587, filed on May 15, 2009, now Pat. No. 8,594,740.

(51) Int. Cl.

| | | |
|---|---|---|
| *H04M 1/725* | (2006.01) | |
| *G06F 3/0488* | (2013.01) | |
| *H04N 7/14* | (2006.01) | |
| *G06F 3/041* | (2006.01) | |
| *G06F 3/14* | (2006.01) | |
| *H04N 1/00* | (2006.01) | |

(52) U.S. Cl.
CPC ........ *G06F 3/04883* (2013.01); *G06F 3/1454* (2013.01); *G06F 17/242* (2013.01); *H04M 1/72544* (2013.01); *H04N 1/00209* (2013.01); *H04N 7/141* (2013.01); *H04M 2250/22* (2013.01)

(58) Field of Classification Search
USPC .................................................. 455/550.1
See application file for complete search history.

(56) References Cited

U.S. PATENT DOCUMENTS

| | | |
|---|---|---|
| 6,556,222 B1 | 4/2003 | Narayanaswami |
| 6,661,438 B1 | 12/2003 | Shiraishi et al. |
| 6,809,724 B1 | 10/2004 | Shiraishi et al. |
| 7,120,455 B1 | 10/2006 | Chen et al. |
| 7,262,785 B2 | 8/2007 | Silverman et al. |
| 7,697,002 B2 | 4/2010 | McCall et al. |
| 8,464,167 B2 | 6/2013 | Saund et al. |
| 8,701,020 B1 | 4/2014 | Huang et al. |
| 8,811,951 B1 | 8/2014 | Faaborg et al. |
| 8,941,500 B1 | 1/2015 | Faaborg et al. |
| 9,430,065 B2 | 8/2016 | Petkov et al. |
| 9,489,081 B2 | 11/2016 | Anzures et al. |
| 9,639,512 B1 | 5/2017 | Carter |
| 2002/0154120 A1 | 10/2002 | Cullimore et al. |
| 2004/0044732 A1 | 3/2004 | Fushiki et al. |
| 2004/0100497 A1 | 5/2004 | Quillen et al. |
| 2005/0030282 A1 | 2/2005 | Lee et al. |
| 2005/0257137 A1 | 11/2005 | Weber et al. |
| 2006/0063539 A1 | 3/2006 | Beyer |
| 2006/0170669 A1 | 8/2006 | Walker et al. |
| 2006/0209802 A1 | 9/2006 | Kang et al. |
| 2007/0038943 A1 | 2/2007 | FitzGerald et al. |
| 2007/0106739 A1 | 5/2007 | Clark et al. |
| 2007/0168879 A1 | 7/2007 | Reville et al. |
| 2007/0253600 A1 | 11/2007 | Furukawa et al. |
| 2007/0271528 A1 | 11/2007 | Park et al. |
| 2008/0003985 A1 | 1/2008 | Jung et al. |
| 2008/0057926 A1 | 3/2008 | Forstall et al. |
| 2008/0119235 A1 | 5/2008 | Nielsen et al. |
| 2008/0122796 A1 | 5/2008 | Jobs et al. |
| 2008/0201438 A1 | 8/2008 | Mandre |
| 2008/0234006 A1 | 9/2008 | Lee et al. |
| 2008/0307342 A1 | 12/2008 | Furches et al. |
| 2009/0059730 A1 | 3/2009 | Lyons et al. |
| 2009/0082616 A1 | 3/2009 | Selig |
| 2009/0085889 A1 | 4/2009 | Hyeon |
| 2009/0088659 A1 | 4/2009 | Graham et al. |
| 2009/0091626 A1 | 4/2009 | Kaplan et al. |
| 2009/0177978 A1 | 7/2009 | Hagale et al. |
| 2009/0198780 A1 | 8/2009 | Koch |
| 2009/0276702 A1 | 11/2009 | Bamford et al. |
| 2009/0312065 A1 | 12/2009 | Wang et al. |
| 2010/0020221 A1 | 1/2010 | Tupman et al. |
| 2010/0050086 A1 | 2/2010 | Sherrard et al. |
| 2010/0088628 A1 | 4/2010 | Flygh et al. |
| 2010/0138756 A1 | 6/2010 | Saund et al. |
| 2010/0211915 A1 | 8/2010 | Sawai |
| 2010/0251179 A1 | 9/2010 | Cragun et al. |
| 2010/0262905 A1 | 10/2010 | Li |
| 2010/0266323 A1 | 10/2010 | Min |
| 2010/0306702 A1 | 12/2010 | Warner |
| 2011/0022992 A1 | 1/2011 | Zhou et al. |
| 2011/0078634 A1 | 3/2011 | Klappert et al. |
| 2011/0096040 A1 | 4/2011 | Hasegawa |
| 2011/0151850 A1 | 6/2011 | Haaparanta et al. |
| 2011/0157046 A1 | 6/2011 | Lee et al. |
| 2011/0167350 A1 | 7/2011 | Hoellwarth |
| 2011/0214044 A1 | 9/2011 | Davis et al. |
| 2011/0227718 A1 | 9/2011 | Wäller et al. |
| 2011/0304557 A1 | 12/2011 | Wilburn et al. |
| 2012/0030624 A1 | 2/2012 | Migos |
| 2012/0036147 A1 | 2/2012 | Borst et al. |
| 2012/0042283 A1 | 2/2012 | Tuesta et al. |
| 2012/0058785 A1 | 3/2012 | Clark et al. |
| 2012/0210261 A1 | 8/2012 | Sarnoff et al. |
| 2012/0216113 A1 | 8/2012 | Li |
| 2012/0252416 A1 | 10/2012 | Kissinger et al. |
| 2012/0253485 A1 | 10/2012 | Weast et al. |
| 2012/0266069 A1 | 10/2012 | Moshiri et al. |
| 2012/0306765 A1 | 12/2012 | Moore |
| 2013/0014022 A1 | 1/2013 | Takasugi et al. |
| 2013/0050119 A1 | 2/2013 | Nemoto |
| 2013/0050141 A1 | 2/2013 | Park et al. |
| 2013/0069889 A1 | 3/2013 | Pearce et al. |
| 2013/0086487 A1 | 4/2013 | Findlay et al. |
| 2013/0096895 A1 | 4/2013 | Willard et al. |
| 2013/0125062 A1 | 5/2013 | Lee et al. |
| 2013/0176505 A1 | 7/2013 | Lee et al. |
| 2013/0179800 A1 | 7/2013 | Jeong et al. |
| 2013/0227474 A1 | 8/2013 | Dondurur et al. |
| 2013/0275525 A1 | 10/2013 | Molina et al. |
| 2013/0283180 A1 | 10/2013 | Vance et al. |
| 2013/0321306 A1 | 12/2013 | Bauermeister et al. |
| 2014/0002621 A1 | 1/2014 | Uesaka et al. |
| 2014/0006941 A1 | 1/2014 | Smirnova |
| 2014/0007008 A1 | 1/2014 | Baca et al. |
| 2014/0043427 A1 | 2/2014 | Wang et al. |
| 2014/0062892 A1 | 3/2014 | Dickinson et al. |
| 2014/0066131 A1 | 3/2014 | Yoo |
| 2014/0068494 A1 | 3/2014 | Petersen et al. |
| 2014/0082522 A1 | 3/2014 | Gunderson et al. |
| 2014/0143678 A1 | 5/2014 | Mistry et al. |
| 2014/0149884 A1 | 5/2014 | Flynn, III et al. |
| 2014/0149946 A1 | 5/2014 | Feller et al. |
| 2014/0184497 A1 | 7/2014 | Birnbaum et al. |
| 2014/0188271 A1 | 7/2014 | Hernandez et al. |
| 2014/0325410 A1 | 10/2014 | Jung et al. |
| 2014/0325435 A1 | 10/2014 | Jung et al. |
| 2014/0365850 A1 | 12/2014 | Maloney et al. |
| 2014/0365912 A1 | 12/2014 | Shaw et al. |
| 2014/0365980 A1 | 12/2014 | Morrison et al. |
| 2015/0015508 A1 | 1/2015 | Song et al. |
| 2015/0039466 A1 | 2/2015 | Skinner et al. |
| 2015/0066683 A1 | 3/2015 | Azose |
| 2015/0082237 A1 | 3/2015 | Konishi et al. |
| 2015/0121251 A1 | 4/2015 | Kadirvel et al. |
| 2015/0135108 A1 | 5/2015 | Pope et al. |
| 2015/0149930 A1 | 5/2015 | Walkin et al. |
| 2015/0154443 A1 | 6/2015 | Ookawara et al. |
| 2015/0160807 A1 | 6/2015 | Vakharia et al. |
| 2015/0160832 A1 | 6/2015 | Walkin et al. |
| 2015/0177975 A1 | 6/2015 | Lee et al. |
| 2015/0206005 A1 | 7/2015 | Jung et al. |
| 2015/0254281 A1 | 9/2015 | Sauvé et al. |
| 2015/0261336 A1 | 9/2015 | Lee et al. |
| 2015/0269009 A1 | 9/2015 | Faaborg et al. |
| 2015/0277685 A1 | 10/2015 | Shieh et al. |
| 2015/0358550 A1 | 12/2015 | Faber et al. |
| 2015/0358580 A1 | 12/2015 | Zhou et al. |
| 2016/0037124 A1 | 2/2016 | Song et al. |
| 2016/0042547 A1 | 2/2016 | Lee et al. |
| 2016/0062541 A1 | 3/2016 | Anzures et al. |
| 2016/0062574 A1 | 3/2016 | Anzures et al. |
| 2016/0062630 A1 | 3/2016 | Anzures et al. |
| 2016/0098093 A1 | 4/2016 | Cheon et al. |

(56) References Cited

U.S. PATENT DOCUMENTS

| | | | |
|---|---|---|---|
| 2016/0147436 | A1 | 5/2016 | Tsutsui |
| 2016/0162177 | A1 | 6/2016 | Kim |
| 2016/0253090 | A1 | 9/2016 | Angelov et al. |
| 2017/0168707 | A1 | 6/2017 | Anzures et al. |
| 2017/0357324 | A1 | 12/2017 | Chaudhri et al. |

FOREIGN PATENT DOCUMENTS

| | | | |
|---|---|---|---|
| CN | 102968235 | A | 3/2013 |
| CN | 103116468 | A | 5/2013 |
| CN | 103488421 | A | 1/2014 |
| CN | 103631514 | A | 3/2014 |
| CN | 103870190 | A | 6/2014 |
| CN | 205176822 | U | 4/2016 |
| EP | 2133841 | A1 | 12/2009 |
| EP | 2180677 | A2 | 4/2010 |
| EP | 2323322 | A1 | 5/2011 |
| EP | 2698686 | A2 | 2/2014 |
| EP | 2733598 | A2 | 5/2014 |
| EP | 2741177 | A1 | 6/2014 |
| JP | 2000-134456 | A | 5/2000 |
| JP | 2003-333318 | A | 11/2003 |
| JP | 2004-165939 | A | 6/2004 |
| JP | 2005-056244 | A | 3/2005 |
| JP | 2008-047122 | A | 2/2008 |
| KR | 10-0798447 | B1 | 1/2008 |
| TW | 200910167 | A | 3/2009 |
| TW | 200949629 | A | 12/2009 |
| TW | 201123817 | A | 7/2011 |
| WO | 2011/107656 | A1 | 9/2011 |
| WO | 2014/004558 | A2 | 1/2014 |
| WO | 2016/036427 | A1 | 3/2016 |

OTHER PUBLICATIONS

Final Office Action received for U.S. Appl. No. 14/839,919, dated Jul. 5, 2018, 73 pages.
Office Action received for Chinese Patent Application No. 201510548824.7, dated May 3, 2018, 19 pages (6 pages of English Translation and 13 pages of Official Copy).
Advisory Action received for U.S. Appl. No. 12/466,587, dated Jun. 7, 2013, 3 pages.
Advisory Action received for U.S. Appl. No. 14/921,414, dated Mar. 15, 2017, 4 pages.
Corrected Notice of Allowance received for U.S. Appl. No. 14/921,414, dated Mar. 30, 2018, 2 pages.
Decision to Refusal received for European Patent Application No. 09161198.8, dated Jan. 9, 2018, 22 pages.
Extended European Search Report (includes European Search Report and Search Opinion) received for European Patent Application No. 09161198.8, dated Sep. 25, 2009, 7 pages.
Final Office Action received for U.S. Appl. No. 12/466,587, dated Mar. 2, 2012, 18 pages.
Final Office Action received for U.S. Appl. No. 12/466,587, dated Mar. 29, 2013, 13 pages.
Final Office Action received for U.S. Appl. No. 14/921,414, dated Dec. 7, 2016, 11 pages.
Non-Final Office Action received for U.S. Appl. No. 12/466,587, dated Dec. 21, 2012, 12 pages.
Non-Final Office Action received for U.S. Appl. No. 12/466,587, dated Sep. 7, 2011, 10 pages.
Non-Final Office Action received for U.S. Appl. No. 14/921,414, dated Apr. 4, 2017, 11 pages.
Non-Final Office Action received for U.S. Appl. No. 14/921,414, dated Aug. 17, 2016, 9 pages.
Notice of Allowance received for U.S. Appl. No. 12/466,587, dated Jul. 19, 2013, 9 pages.
Notice of Allowance received for U.S. Appl. No. 14/058,901, dated Jun. 23, 2015, 14 pages.
Notice of Allowance received for U.S. Appl. No. 14/921,414, dated Jan. 3, 2018, 11 pages.
Office Action received for European Patent Application No. 09161198.8, dated Jan. 30, 2015, 6 pages.
Office Action received for European Patent Application No. 09161198.8, dated Jun. 6, 2012, 5 pages.
Summons to Attend Oral Proceedings received for European Patent Application No. 09161198.8, dated Mar. 15, 2016, 13 pages.
Summons to Attend Oral Proceedings received for European Patent Application No. 09161198.8, dated May 4, 2017, 13 pages.
Notice of Acceptance received for Australian Patent Application No. 2015312265, dated Aug. 3, 2018, 3 pages.
"Dead Island", Things I Hate about your Design, available online at: https://thingsihateaboutyourdesign.wordpress.com/, Sep. 9, 2011, 3 pages.
"Idroo Whiteboard for Skype", Available at https://web.archive.org/web/20130817130818/http://www.idroo.com, Aug. 17, 2013, 1 page.
App Reviews—crazymikesapps.com, "Draw Something Free ipad App Review-Crazymikeapps", Available Online at: https://www.youtube.com/watch?v=26-TR6hR93U, Feb. 27, 2012, 1 page.
Barton, "Broken Heart Animation", retrieved from the Internet: URL: https://WNW.youtube.com/watch?v= EGP7VUUcOdw, Apr. 23, 2011, 1 page.
Final Office Action received for U.S. Appl. No. 14/839,918, dated Jun. 1, 2016, 22 pages.
International Preliminary Report on Patentability received for PCT Patent Application No. PCT/US2015/046778, dated Mar. 16, 2017, 24 pages.
International Preliminary Report on Patentability received for PCT Patent Application No. PCT/US2015/034609, dated Mar. 16, 2017, 10 pages.
International Search Report and Written Opinion received for PCT Application No. PCT/US2017/035324, dated Oct. 13, 2017, 20 pages.
International Search Report and Written Opinion received for PCT Patent Application No. PCT/US2015/034609, dated Sep. 24, 2015, 14 pages.
International Search Report and Written Opinion received for PCT Patent Application No. PCT/US2015/046778, dated Mar. 31, 2016, 31 pages.
Invitation to Pay Additional Fee received for PCT Patent Application No. PCT/US2017/035324, dated Aug. 17, 2017, 2 pages.
Invitation to Pay Additional Fees received for PCT Patent Application No. PCT/US2015/046778, dated Nov. 27, 2015, 7 pages.
Mashable Video, "Feel Me' iOS Texting App Gives You a Direct Live Connection [video]", available at: http://mashable.com/2012/05/27/feel-me/#pKSjsf5FLGqH, May 27, 2012, 2 pages.
Mybrana, "Mybrana 3D Tutorial", Available Online at: https://www.youtube.com/watch?v=9CiJu9BpSR0, Nov. 18, 2014, 1 page.
Non-Final Office Action received for U.S. Appl. No. 14/839,918, dated Feb. 8, 2016, 24 pages.
Non-Final Office Action received for U.S. Appl. No. 14/839,918, dated Feb. 8, 2017, 30 pages.
Non-Final Office Action received for U.S. Appl. No. 14/839,918, dated Sep. 22, 2016, 25 pages.
Non-Final Office Action received for U.S. Appl. No. 14/839,919, dated Oct. 2, 2017, 76 pages.
Non-Final Office Action received for U.S. Appl. No. 14/839,921, dated Apr. 19, 2016, 23 pages.
Non-Final Office Action received for U.S. Appl. No. 14/839,921, dated Nov. 2, 2015, 24 pages.
Notice of Allowance received for Chinese Patent Application No. 201520670045.x, dated Mar. 8, 2016, 5 pages (3 pages of English Translation and 2 pages of Official copy).
Notice of Allowance received for Chinese Patent Application No. 201620476062.4, dated Apr. 20, 2017, 3 pages (2 pages of English Translation and 1 page of Official copy).
Notice of Allowance received for Taiwanese Patent Application No. 104128683, dated Jun. 8, 2016, 4 pages (1 page of English Translation of Search Report and 3 pages of Official Copy) (See Communication under 37 CFR § 1.98(a) (3)).

(56) References Cited

OTHER PUBLICATIONS

Notice of Allowance received for Taiwanese Patent Application No. 104128682, dated Apr. 18, 2018, 9 pages (6 pages of English Translation and 3 pages of Official copy).
Notice of Allowance received for U.S. Appl. No. 14/839,918, dated Aug. 3, 2017, 2 pages.
Notice of Allowance received for U.S. Appl. No. 14/839,918, dated Jul. 14, 2017, 10 pages.
Notice of Allowance received for U.S. Appl. No. 14/839,918, dated Jul. 26, 2017, 2 pages.
Notice of Allowance received for U.S. Appl. No. 14/839,918, dated Nov. 20, 2017, 5 pages.
Notice of Allowance received for U.S. Appl. No. 14/839,921, dated Aug. 9, 2016, 15 pages.
Notice of Allowance received for U.S. Appl. No. 15/345,130, dated Jun. 27, 2017, 8 pages.
Office Action received for Australian Patent Application No. 2015101203, dated Dec. 14, 2015, 3 pages.
Office Action received for Australian Patent Application No. 2015101204, dated Dec. 17, 2015, 4 pages.
Office Action received for Australian Patent Application No. 2015312265, dated Nov. 28, 2017, 5 pages.
Office Action received for Australian Patent Application No. 2016100553, dated Jan. 11, 2017, 4 pages.
Office Action received for Australian Patent Application No. 2016100553, dated Jul. 14, 2016, 4 pages.
Office Action received for Australian Patent Application No. 2016100553, dated Oct. 4, 2016, 3 pages.
Office Action received for Australian Patent Application No. 2016100553, dated Oct. 28, 2016, 5 pages.
Office Action received for Chinese Patent Application No. 201510549823.4, dated Dec. 18, 2017, 21 pages (7 pages of English Translation and 14 pages of Official copy).
Office Action received for Chinese Patent Application No. 201520669793.6, dated Mar. 31, 2016, 4 pages (3 pages of English Translation and 1 page of Official copy).
Office Action received for Chinese Patent Application No. 201520669793.6, dated Nov. 3, 2015, 3 pages (2 pages of English Translation and 1 page of Official copy).
Office Action received for Chinese Patent Application No. 201620476062.4, dated Jan. 6, 2017, 3 pages (1 page of English Translation and 2 pages of Official copy).
Office Action received for Chinese Patent Application No. 201620476062.4, dated Sep. 14, 2016, 3 pages (1 page of English Translation and 2 pages of Official copy).
Office Action received for Danish Patent Application No. PA201570564, dated Apr. 5, 2016, 11 pages.
Office Action received for Danish Patent Application No. PA201570564, dated Dec. 9, 2016, 12 pages.
Office Action received for Danish Patent Application No. PA201570564, dated Feb. 21, 2018, 15 pages.
Office Action received for Danish Patent Application No. PA201570564, dated May 24, 2016, 13 pages.
Office Action received for Danish Patent Application No. PA201570566, dated Feb. 15, 2016, 10 pages.
Office Action received for Danish Patent Application No. PA201570566, dated May 5, 2017, 14 pages.
Office Action received for Danish Patent Application No. PA201570566, dated Sep. 26, 2016, 12 pages.
Office Action received for Danish Patent Application No. PA201570566, dated Sep. 5, 2016, 12 pages.
Office Action received for Danish Patent Application No. PA201670596, dated Feb. 15, 2017, 6 pages.
Office Action received for Danish Patent Application No. PA201670596, dated Nov. 2, 2017, 6 pages.
Office Action received for Danish Patent Application No. PA201670596, dated Oct. 11, 2016, 11 pages.
Office Action received for Taiwanese Patent Application No. 104128681, dated Oct. 11, 2016, 54 pages (22 pages of English Translation and 32 pages of Official copy).
Office Action received for Taiwanese Patent Application No. 104128682, dated Nov. 8, 2016, 15 pages (6 pages of English Translation and 9 pages of Official copy).
Office Action received for Taiwanese Patent Application No. 104128682, dated Sep. 30, 2017, 11 pages (5 pages of English Translation and 6 pages of Official copy).
Plaugic, Lizzie, "Periscope Now Lets Users Sketch Over Live Streams", Available Online at: http://www.theverge.com/2016/4/28/11529270/periscope-sketcbing-new-feature-ios, Apr. 28, 2016, 2 pages.
Search Report and Opinion received for Netherlands Patent Application No. 2015373, dated Jun. 6, 2017, 18 pages (7 pages of English Translation and 11 pages of Official copy).
Search Report and Opinion received for Netherlands Patent Application No. 2015375, dated Jun. 13, 2017, 18 pages (8 pages of English Translation and 10 pages of Official copy).
Search Report and Opinion received for Netherlands Patent Application No. 2019802, dated Mar. 15, 2018, 9 pages (4 pages of English Translation and 5 pages of Official copy).
Sony Experia, "Sony Xperia Z3 User Guide / Manual (d6603/d6653)", Retrieved from: http://sony-xperia.mobi/eng/files/userguide/userguide_EN_D6603_D6653_1_Android4.4.pdf, 2014, pp. 1-135.
Sony Xperia, "Xperia™ Z3—Get Creative with Your Photos and Videos Using AR Fun", Retrieved from: https://www.youtube.com/watch?v=WhYNe3B-sHY, Sep. 29, 2014, pp. 1-5.
Office Action received for Chinese Patent Application No. 201510549823.4, dated Aug. 9, 2018, 7 pages (3 pages of English Translation and 4 pages of Official copy).
Notice of Allowance received for U.S. Appl. No. 14/839,919, dated Nov. 5, 2018, 29 pages.
International Preliminary Report on Patentability received for PCT Patent Application No. PCT/US2017/035324, dated Dec. 27, 2018, 15 pages.
Non-Final Office Action received for U.S. Appl. No. 15/608,817, dated Jan. 10, 2019, 46 pages.
Office Action received for Chinese Patent Application No. 201510548824.7, dated Jan. 15, 2019, 7 pages (3 pages of English Translation and 4 pages of Official Copy).

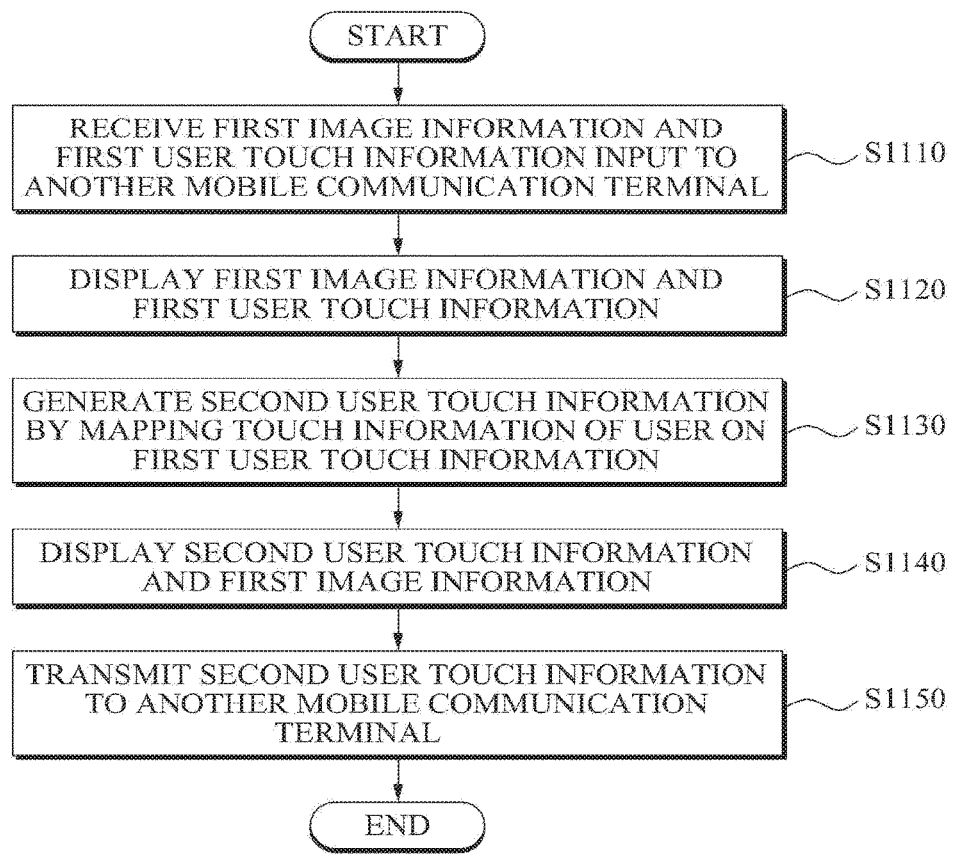

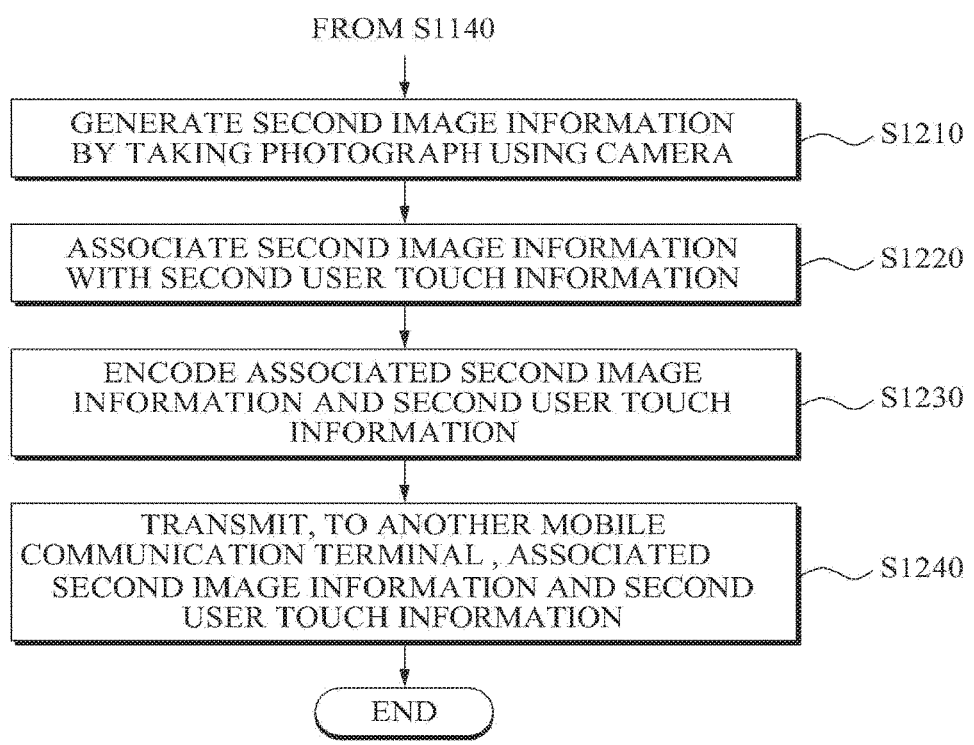

MOBILE COMMUNICATION TERMINAL AND DATA INPUT METHOD

CROSS-REFERENCE TO RELATED APPLICATIONS

This application is a continuation of U.S. patent application Ser. No. 14/921,414, filed Oct. 23, 2015, now allowed, which is a continuation of U.S. patent application Ser. No. 14/058,901, filed on Oct. 21, 2013, now U.S. Pat. No. 9,172,906, issued on Oct. 27, 2015, which is a continuation of U.S. patent application Ser. No. 12/466,587, filed on May 15, 2009, now U.S. Pat. No. 8,594,740, issued on Nov. 26, 2013, which claims priority from and the benefit of Korean Patent Application No. 10-2008-0054445, filed on Jun. 11, 2008 and Korean Patent Application No, 10-2008-0103080, filed on Oct. 21, 2008, all of which are hereby incorporated by reference in their entireties for all purposes as fully set forth herein.

BACKGROUND

Field

The present invention relates to a data input method and a mobile communication terminal that may display touch data such as characters and pictures along with image data on an image display area, may generate touch data according to a touch input in a touch area, and may store the touch data associated with the image data.

Discussion of the Background

With increased usage and development of communication technologies, various services such as games, wireless Internet connectivity, still and video image capture, and the like, are provided in a mobile communication terminal, along with voice call service and a short message service (SMS).

A user may record moving images and take photos using a camera installed in a mobile communication terminal. Image data taken from photos and moving images may be transmitted to one or more other mobile communication terminals using a multimedia messaging service (MMS).

FIG. 1 is a diagram illustrating an example of recording moving images in a mobile communication terminal.

The mobile communication terminal may generate image data based on a user's operation, and may store the generated image data in a storage module. However, the mobile communication terminal has no capability to insert characters and pictures into the image data when generating the image data. That is, mobile communication terminal may not provide such functions as inserting pictures and characters into the image data.

Accordingly, a new technique is required to save touch data, such as characters and pictures, associated with image data and to display the touch data along with the image data when the image data is played or retrieved.

SUMMARY

This invention provides a data input method where touch data can be generated according to a touch input in a touch area corresponding to the image display area. The touch data may be associated with image data, and stored so that when the image data is displayed, the touch data is also displayed. This invention also provides a mobile communication terminal to perform the data input method.

This invention also provides a data input method that may increase user enjoyment by associating touch data, such as characters, icons, and graphics, with image data. This invention also provides a mobile communication terminal to perform the method.

According to exemplary embodiments of the present invention, a user of a mobile communication terminal may share a memo sharing area while viewing a video call screen of another user to generate character and picture data in real time, and transmit the generated character and picture data in real time, and another obile communication terminal may simultaneously verify a video call screen and a memo sharing area of the other user, thereby providing an environment in which communication between users may be effectively and smoothly performed.

Additional features of the invention will be set forth in the description which follows, and in part will be apparent from the description, or may be learned by practice of the invention.

An exemplary embodiment discloses a communication terminal having a transceiver to receive first touch information from a counterpart terminal, the first touch information having coordinate information of a touch input inputted by a user of the counterpart terminal, the coordinate information being identified based on a coordinate of the touch input on an image displayed on the counterpart terminal. An image signal processor of the communication terminal controls the first touch information to be displayed on a display of the communication terminal, and controls image information corresponding to the image displayed on the counterpart terminal to be displayed on the display in association with the first touch information, and controls the first touch information to be displayed on the image information.

An exemplary embodiment also discloses a method for performing a touch input communication by a communication terminal, the method including: performing a communication with a counterpart terminal; receiving first touch information from the counterpart terminal, the first touch information including coordinate information of a touch input inputted by a user of the counterpart terminal, the coordinate information being identified based on a coordinate of the touch input on an image displayed on the counterpart terminal; controlling image information corresponding to the image displayed on the counterpart terminal to be displayed on a display of the communication terminal; and controlling the first touch information to be displayed on the display in association with the image information, wherein the first touch information is displayed on the image information.

An exemplary embodiment further discloses a method for performing a touch input communication, the method including: performing a communication with a counterpart terminal; displaying image information on a display; recognizing a touch input, the touch input being inputted on the image information; generating first touch information from the touch input, the first touch information including an annotated image corresponding to a location of the touch input in association with the image information; and transmitting the image information and the first touch information to the counterpart terminal.

This invention discloses a data input method including displaying image data on an image display area, generating touch data according to a touch input in a touch area, associating the touch data with the image data, and storing the touch data associated the image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 11 and FIG. 12 are flowcharts illustrating a method of controlling a mobile communication terminal capable of sharing a display area during a video call according to an exemplary embodiment of the present invention.

DETAILED DESCRIPTION OF THE ILLUSTRATED EMBODIMENTS

Figure 1:
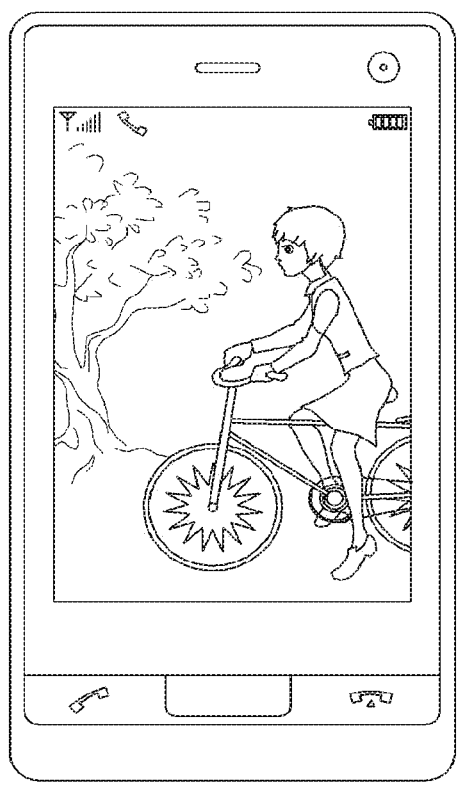
FIG. 1 is a diagram illustrating an example of recording moving images in a mobile communication terminal according to a conventional art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A mobile communication terminal as used throughout the present specification may be, for example and without specific limitation, a computer, a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1×, 3×) phone, a Wideband CDMA (WCDMA) phone, a dual band/dual mode phone, a Global System for Mobile Communications (GSM) phone, a mobile broadband system (MBS) phone, or a satellite/terrestrial Digital Multimedia Broadcasting (DMB) phone.

Figure 2:
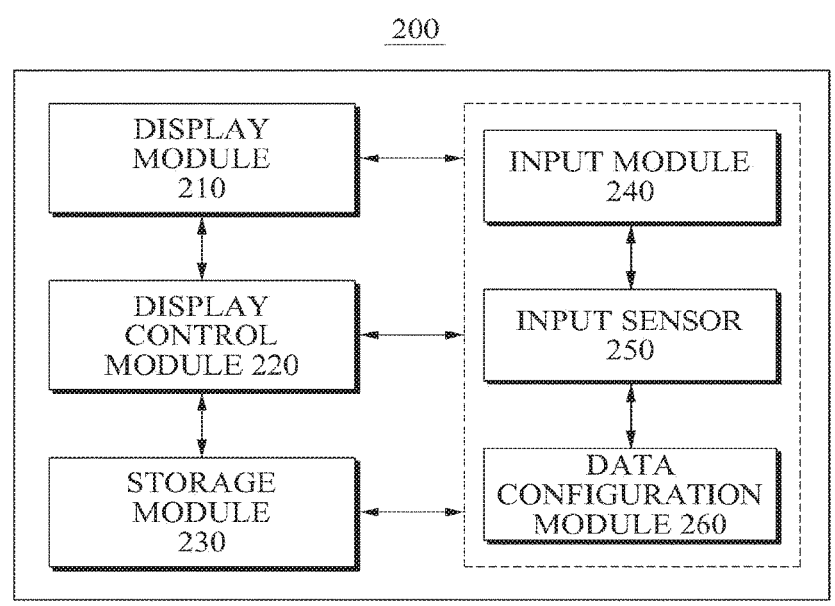
FIG. 2 is a diagram illustrating a configuration of a mobile communication terminal according to an exemplary embodiment of the present invention.

FIG. 2 is a diagram illustrating a configuration of a mobile communication terminal 200 according to an exemplary embodiment of the present invention.

As illustrated, the mobile communication terminal 200 may include a display module 210, a display control module 220, a storage module 230, an input module 240, an input sensor 250, and a data configuration module 260.

The display module 210 may display image data, generated via a camera or received from another mobile communication terminal, such as by MMS, on an image display area. The image data may be a still image or picture, or video or moving images, taken via a camera installed in the mobile communication terminal 200 or received from another mobile communication terminal, such as by MMS. Alternatively, the image data may be a document with characters, with or without images, in an application-specific format, such as pdf, or in an image format, such as JPEG. The image data may be captured by the mobile communication terminal, or may be received at the mobile communication terminal by MMS, through an email server and an email application on the mobile communication terminal, through an internet application on the mobile communication terminal, or through any other wireless or wired data transfer mechanism, including without limitation a device-to-device transfer mechanism, such as a short range wireless communication module including an Infrared Data Association (IrDA) module or a Bluetooth® module. The image display area may be an area displaying images on a screen.

The input module 240 may generate touch data according to a touch input in a touch area corresponding to the image display area. The touch area may include all of the image display area. That is, to receive the touch data from a user, the touch area may be arranged to correspond to the display area. As an example, the touch data may be any graphical data, including characters, figures, pictures, emoticons, diagrams and the like, and may be inputted via various devices such as sticks or a stylus, pens, fingers, and the like. The user may also select other features of the touch data, such as color or thickness.

For this, the input sensor 250 may calculate coordinate information about a point or series of points where the touch input is received in the touch area. The coordinate information may be specific information about where the touch data is inputted on the touch area, and, based on the coordinate information, includes a location where the touch data is to be displayed and/or data about whether the touch data corresponds to one of characters, pictures, diagrams, figures, and emoticons.

The data configuration module 260 may generate the touch data based on calculated coordinate information. Also, the data configuration module 260 may obtain time information of a time when the touch input is received, and may associate the touch data with the image data based on the obtained time information and the coordinate information.

That is, by associating the touch data along with the image data based on the time information and the coordinate information, when the image data is played back or retrieved or selected to be displayed on the mobile communication terminal 200, the data configuration module 260 enables the touch data to be displayed on the display module 210 along with the image data at a time during the playback corresponding to a time when the touch data is inputted. As an example, if five minutes of video as image data is generated, and touch data of 'DUMMY' is inputted at a time of two minutes thirty seconds into the generation or playback of the video, the data configuration module 260 may mix the touch data with the image data representing the video at that time and the display module 210 will display the touch data of 'DUMMY' at two minutes and thirty seconds when next playing back the video.

If the touch input moves over the touch area, the data configuration module 260 may generate touch data having a shape that corresponds to the movement of the touch input.

If the display module 210 provides an emoticon via the image display area, a user may select an emoticon, and thereafter the input module 240 may generate a selected emoticon as the touch data.

The storage module 230 may store the generated touch data along with the image data. That is, the storage module 230 may store the touch data including the time information and coordinate information as data associated with the image data. Throughout this specification, the touch data is described as data "associated with" the image data, and this description is intended to cover many different storage options. One storage option is that the touch data may be stored separately from the image data, as a separate file, but that data associating the image data and the touch data will also be generated and stored. In this manner, the storage module 230 may be able to retrieve the image data in a first format with the touch data or in a second format without the touch data. Alternatively, another storage option is that the touch data is stored as embedded data in the image data, and that the touch data and image data are stored as a single file in the storage module 230. The single file may be encoded and/or compressed. Depending on the storage scheme, a user of the mobile communication terminal may select image data, touch data, or a combination thereof to send to another mobile communication terminal by, for example, MMS. Then, a user may send image data including touch data, or may send either image data or touch data separately.

The display control module 220 may control the touch data to be displayed on the image display area along with the image data. That is, the display control module 220 may control the image data to be associated and displayed with the touch data.

Figure 3:
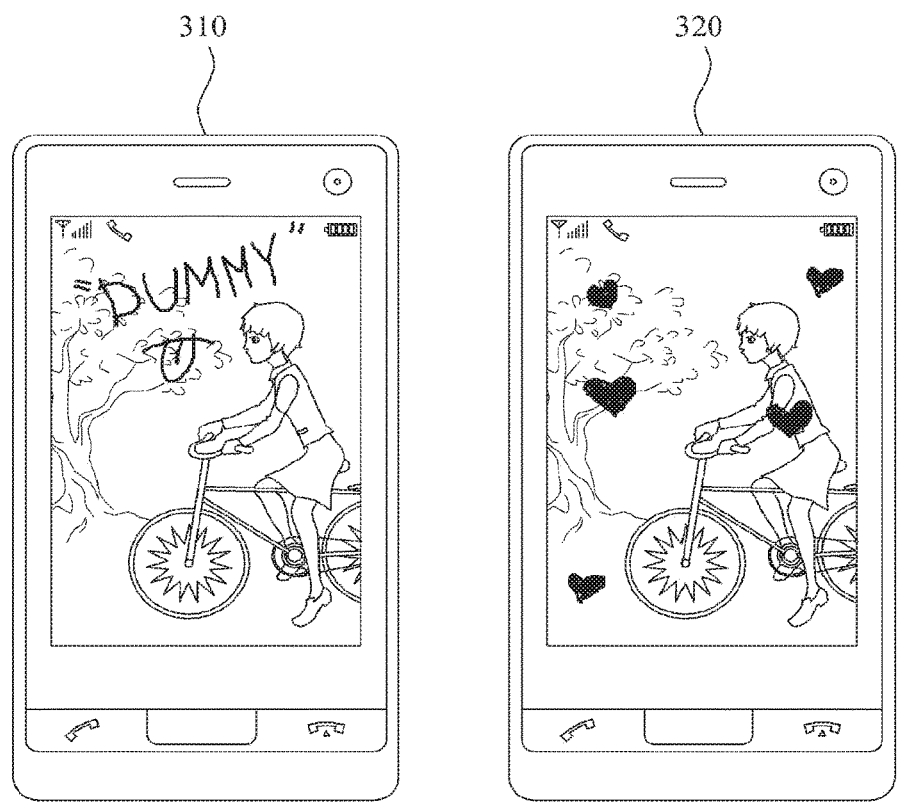
FIG. 3 is a diagram illustrating an example of generating image data in mobile communication terminal of FIG. 2.

FIG. 3 is a diagram illustrating an example of generating image data in the mobile communication terminal 200 of FIG. 2.

As shown in a reference numeral 310, the mobile communication terminal 200 may receive the touch data of 'DUMMY' from the user in the touch area and display the touch data on the image display area. The user may input the touch data of 'DUMMY' using fingers, stylus or sticks, pens, and the like. The mobile communication terminal 200 may store the touch data of 'DUMMY' in the storage module 230 by associating the touch data with the image data based on the time information when the touch data of 'DUMMY' is inputted and coordinate information corresponding to a location on the image data where the touch data is input on the image display area.

Alternatively, as shown in a reference numeral 320, the mobile communication terminal 200 may receive an emoticon, heart shapes in this instance, as touch data when the touch data is generated. If the emoticon is generated as touch data, when the user selects the emoticon and selects a point where the emoticon is to be located, the mobile communication terminal 200 may display the emoticon on the established coordinates where the emoticon is to be located. As explained above, the mobile communication terminal 200 may store the touch data by associating the touch data with the image data in the storage module 230. In this instance, the touch data will include the type of emoticon, the time information, and the coordinate information.

As an example, the mobile communication terminal 200 may provide a list of possible emoticons, permit a user to select one or more emoticons from the provided list of emoticons, and generate the selected emoticon as touch data when the touch input is received. Thus, the user may create or receive new emoticons to add to the list, and revise or delete existing emoticons from the list of emoticons.

Figure 4:
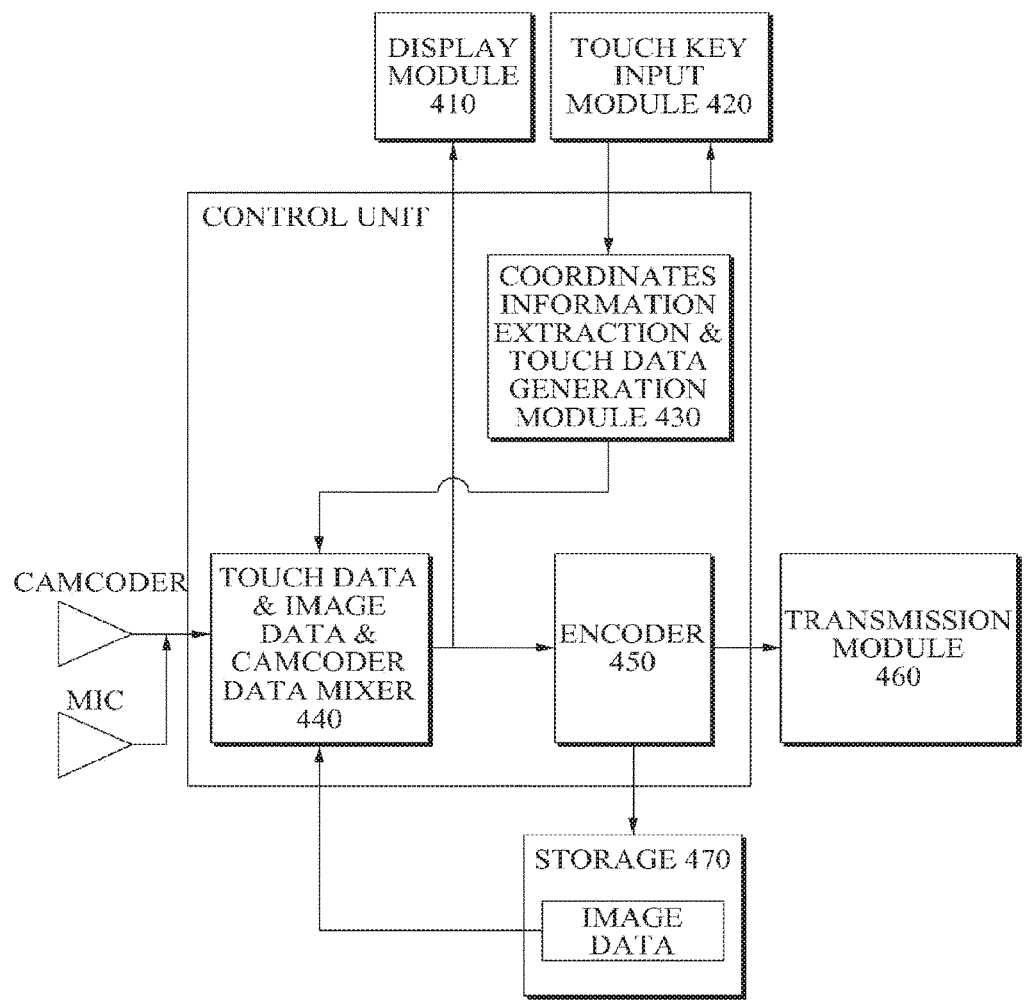
FIG. 4 is a diagram illustrating another configuration of a mobile communication terminal according to an exemplary embodiment of the present invention.

FIG. 4 is a diagram illustrating another configuration of a mobile communication terminal 400 according to an exemplary embodiment of the present invention.

The mobile communication terminal 400 may include a display module 410, a touch key input module 420, a coordinates information extraction and touch data generation module 430, a touch data & image data & camcorder data mixer 440, an encoder 450, a transmission module 460, and a storage 470.

The display module 410 may display image data on an image display area via a camcorder and a microphone (MIC), and the touch key input module 420 may receive touch data from a user. When the user touches the touch area, the coordinates information extraction & touch data generation module 430 may generate the touch data by extracting touched coordinate information. The generated touch data may be associated with the image data in the touch data & input data & camcorder data mixer 440. The encoder 450 may encode the image data and touch data, and the mobile communication terminal may store the encoded image data and touch data in the storage 470. In this context, the storage 470 may store the encoded image data and touch data as a single encoded file. The transmission module 460 may transmit the encoded image data and touch data, such as to another mobile communication terminal by MMS, through an email application, through an internet-based application, or through a wireless or wired data transfer mechanism.

Figure 5:
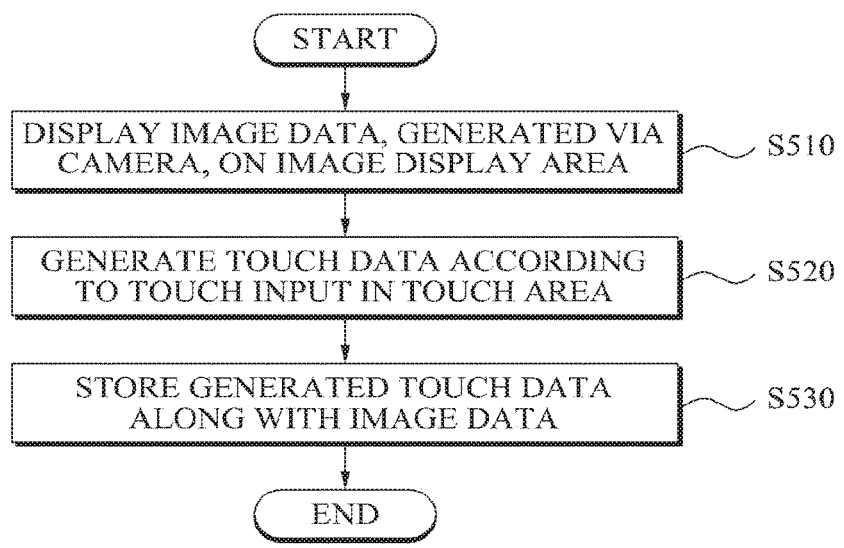
FIG. 5 is a flowchart illustrating a data input method according to an exemplary embodiment of the present invention.

FIG. 5 is a flowchart illustrating a data input method according to an exemplary embodiment of the present invention.

The data input method may be implemented in the mobile communication terminal 200 of FIG. 2 or may be implemented in the mobile communication terminal of FIG. 4. The data input method is described above with respect to the mobile communication terminal 200 shown in FIG. 2.

In operation S510, the mobile communication terminal 200 may display image data on an image display area. The various types of image data are described in more detail above. The image display area may be an area where pictures taken via a camera in the mobile communication terminal 200 are displayed.

In operation S520, the mobile communication terminal 200 may generate touch data according to a touch input in a touch area corresponding to the image display area. The touch area may cover or include all of the image display area. The mobile communication terminal 200 may obtain time information of a time when the touch input is received via a timer and may calculate coordinate information about a point where the touch input is received in the touch area.

In operation S530, the mobile communication terminal 200 may store the generated touch data associated with the image data in the storage module 230. That is, the mobile communication terminal 200 may associate the touch data with the image data based on the time information and the coordinate information, and may store the associated data in the storage module 230, thereby enabling the touch data and the image data to be retrieved from the storage module 230 and displayed on a display module 210.

Similarly, the mobile communication terminal 200, as illustrated in FIG. 3, may display the generated touch data on the image display area along with the image data.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may include a processor to execute the program instructions and a memory, and may be configured to act as one or more software modules in order to perform the operations of the above-described exemplary embodiments of the present invention.

According to the exemplary embodiments of the present invention, touch data can be generated according to a touch input in a touch area corresponding to the image display area. The touch data may be associated with the image data, and stored so that when the image data is retrieved and displayed, the touch data is also displayed.

According to the exemplary embodiments of the present invention, user enjoyment may be increased by associating touch data, such as characters, icons, and graphics, with image data.

Figure 6:
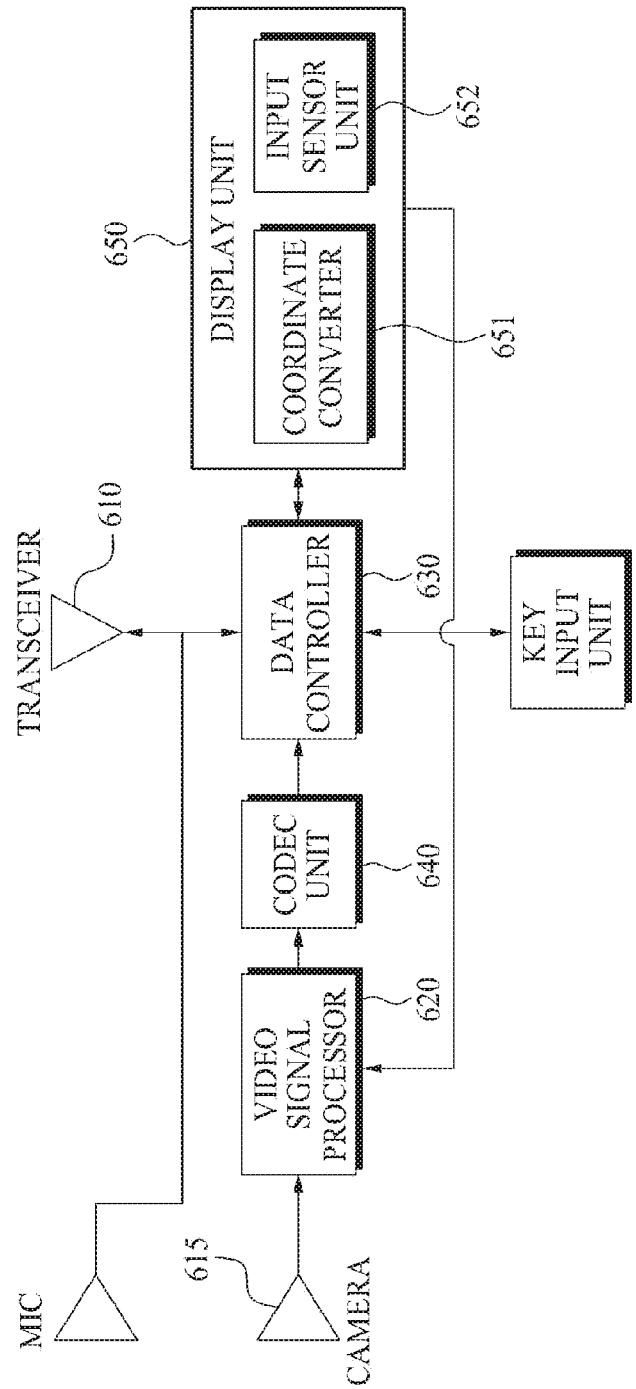
FIG. 6 is a diagram illustrating a configuration of a mobile communication terminal capable of sharing a display area during a video call according to an exemplary embodiment of the present invention.

FIG. 6 is a diagram illustrating a configuration of a mobile communication terminal capable of sharing a display area during a video call according to an exemplary embodiment of the present invention. A configuration of a mobile communication terminal capable of sharing a display area during a video call according to an exemplary embodiment of the present invention will be described with reference to FIG. 6.

Referring to FIG. 6, the mobile communication terminal capable of sharing a display area during a video call according to an exemplary embodiment of the present invention may include a transceiver 610, a camera 615, a video signal processor 620, a codec unit 640, a data controller 630, and a display unit 650. The display unit 650 may include a coordinate converter 651 and an input sensor unit 652.

The transceiver 610 may receive first user touch information input to another mobile communication terminal, and first image information photographed in the other mobile communication terminal.

In this instance, the first user touch information may refer to data information, such as a memo, a picture, and the like, generated by a user through a touch screen in a memo sharing area on a touch screen display area, and the first image information may refer to image information photographed through a camera in the other mobile communication terminal. The transceiver 610 may receive the first user touch information and the first image information.

The memo sharing area according to an exemplary embodiment of the present invention may refer to a sharing area located in a predetermined place in a display area of a terminal, and not be limited to a particular place.

When receiving a user input indication (UII) message, the memo sharing area may be expanded, and the UII message may additionally include terminal control data, such as a vibration, a light emitting diode (LED), and the like, and be delivered.

The video signal processor 620 may control the received first user touch information and first image information to be displayed.

That is, the video signal processor 620 may control the received first user touch information and first image information to be displayed on the display unit 650, and each of the first user touch information and the first image information may be displayed on a separate area on the display unit 650.

The data controller 630 may generate second user touch information by mapping touch information generated through a touch input of a user on the displayed first user touch information.

That is, the data controller 630 may generate the second user touch information by additionally generating data information, such as a memo, a picture, and the like, generated through a touch input of a user on the first user touch information received by the other mobile communication terminal.

The video signal processor 620 may control the generated second user touch information and the first image information corresponding to an image photographed by a camera received from the other mobile communication terminal to be displayed.

The transceiver 610 may transmit the second user touch information to the other mobile communication terminal, and enable the other mobile communication terminal to receive data information, such as a memo, a picture, and the like, input by a user.

In this instance, the data controller 630 may control a camera 615 to generate the second image information, and control the second image information to be associated with the second user touch information. That is, the data controller 630 may associate an image photographed by a user with a memo or a picture image input by the user, and provide the image associated with the memo or the picture image to the other mobile communication terminal.

The codec unit 640 may encode the associated second image information and second user touch information.

The transceiver 610 may transmit, to the other mobile communication terminal, the encoded second image information and second user touch information.

That is, the second image information photographed and input by a camera 615 may be associated with the second user touch information, encoded by the codec unit 640, and transmitted to the other mobile communication terminal via the data controller 630.

The other mobile communication terminal may decode the second image information in the same scheme as general video data, and display the second image information on a screen.

Thus, according to an exemplary embodiment of the present invention, an image photographed by a user and a memo or a picture image input by the user may be simultaneously provided through a real-time transmission by associating the second image information with the second user touch information.

The video signal processor 620 may control each of the first user touch information and the first image information to be displayed on a separate area, and control each of the second user touch information and the first image information to be displayed on a separate area.

The first user touch information and the second user touch information may be displayed to overlap the first image information. That is, a memo input by a user and a memo input by an opponent user may be displayed in an overlapping form on an image of the opponent user using a telephone.

The display unit 650 may display the first user touch information, the second user touch information, the first image information, and the like.

In particular, the display unit 650 may receive an input of touch information generated through a touch input of a user.

More particularly, the display unit 650 may include a coordinate converter 651 and an input sensor unit 652.

The input sensor unit 652 may receive a touch input of a user, and the coordinate converter 651 may convert the received touch input to a coordinate value. Information about the touch input of the user converted to a coordinate value may be delivered to the data controller 630, and be provided to the other mobile communication terminal through the transceiver 610.

Figure 7:
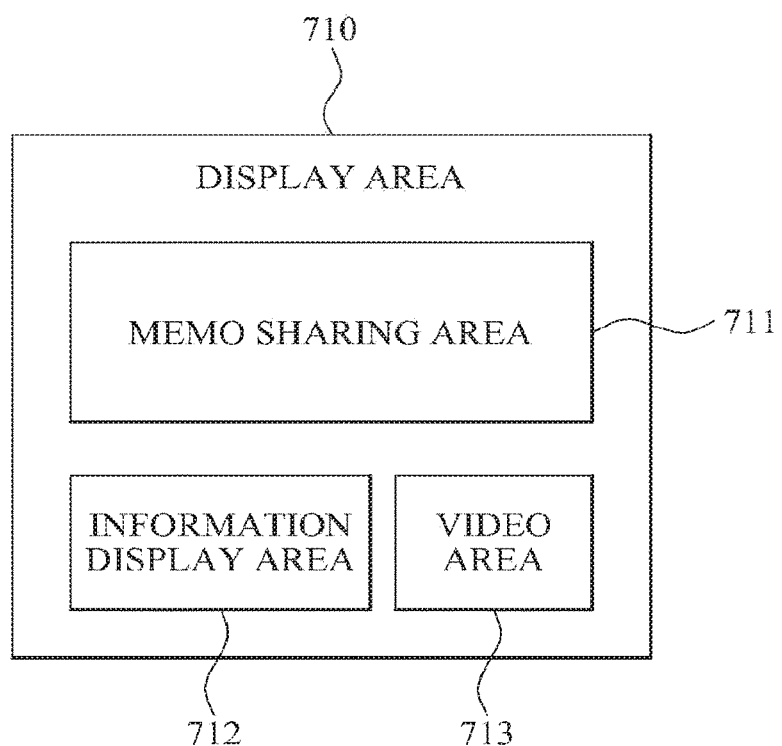
FIG. 7 is a diagram illustrating a display area of a mobile communication terminal capable of sharing a display area during a video call according to an exemplary embodiment of the present invention.

FIG. 7 is a diagram illustrating a display area of a mobile communication terminal capable of sharing a display area during a video call according to an exemplary embodiment of the present invention.

Referring to FIG. 7, a display area 710 may include a memo sharing area 711, an information display area 712, and a video area 713.

In the memo sharing area 711, data information, such as a memo, a picture, and the like, generated by touching on a screen by a user of another mobile communication terminal, and data information, such as a memo, a picture, and the like, generated through a touch input by a user may be displayed.

An input touch delivered through the input sensor unit 652 may be converted to coordinate information by the coordinate converter 651, and be included on a screen in a buffer of the data controller 630, and the data information, such as a memo, a picture, and the like, may be displayed on the memo sharing area 711 of the display unit 650 by a control of the video signal processor 620.

The information display area 712 may correspond to an area for displaying various types of use information, such as information associated with an opponent mobile communication terminal user, information associated with a video call, information about taking a photograph using a camera, information about setting a memo sharing area, and the like.

In the video area 713, an image photographed and received from a camera of a mobile communication terminal of an opponent user may be displayed.

The memo sharing area 711 described in the foregoing may be constructed to overlap on the video area 713, and be constructed so that an area according to a requirement of various users may be disposed.

Figure 8:
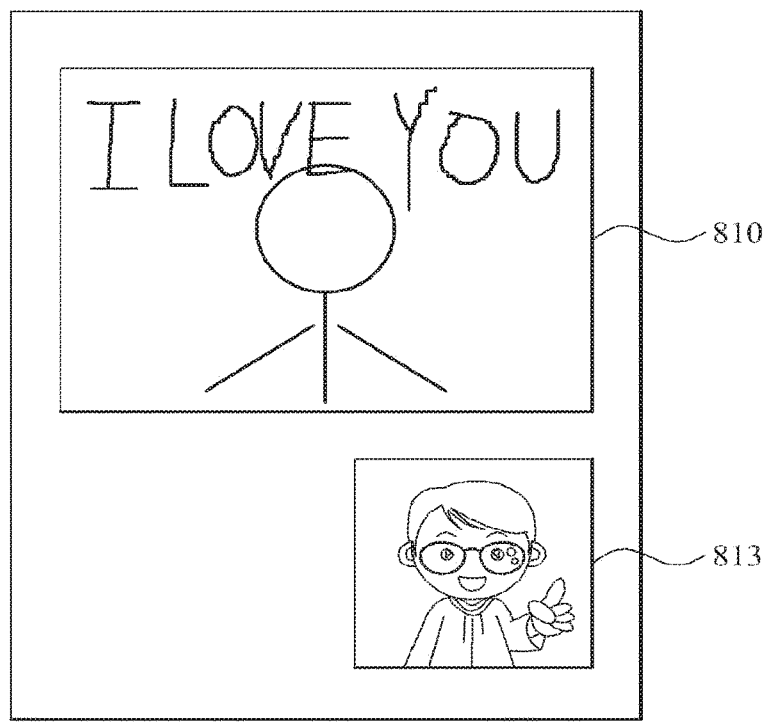
FIG. 8, FIG. 9, and FIG. 10 are diagrams illustrating an example of a display of a mobile communication terminal capable of sharing a display area during a video call according to an exemplary embodiment of the present invention.
Figure 9:
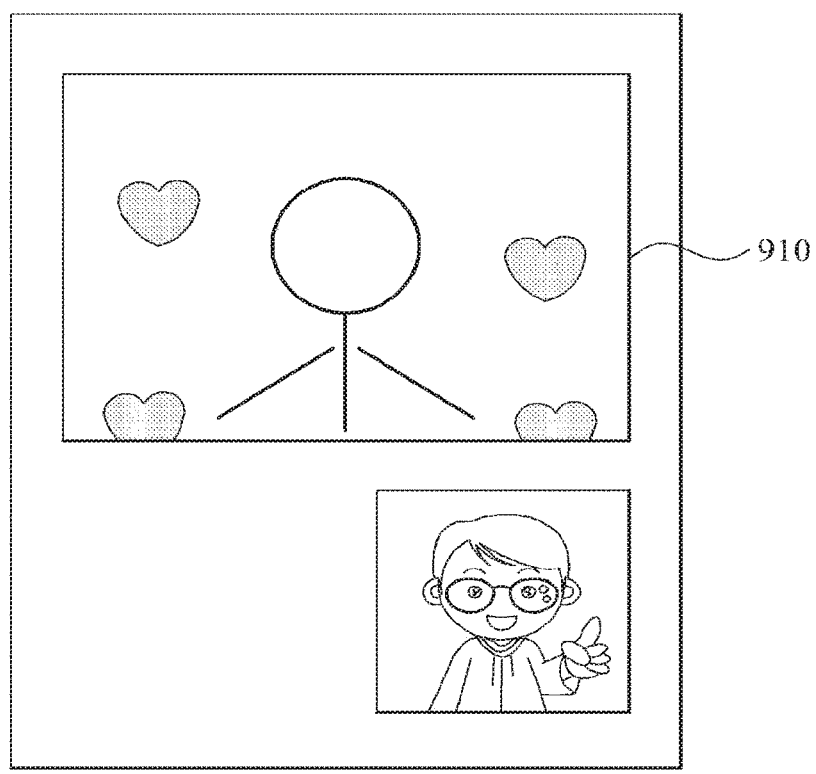
Figure 10:
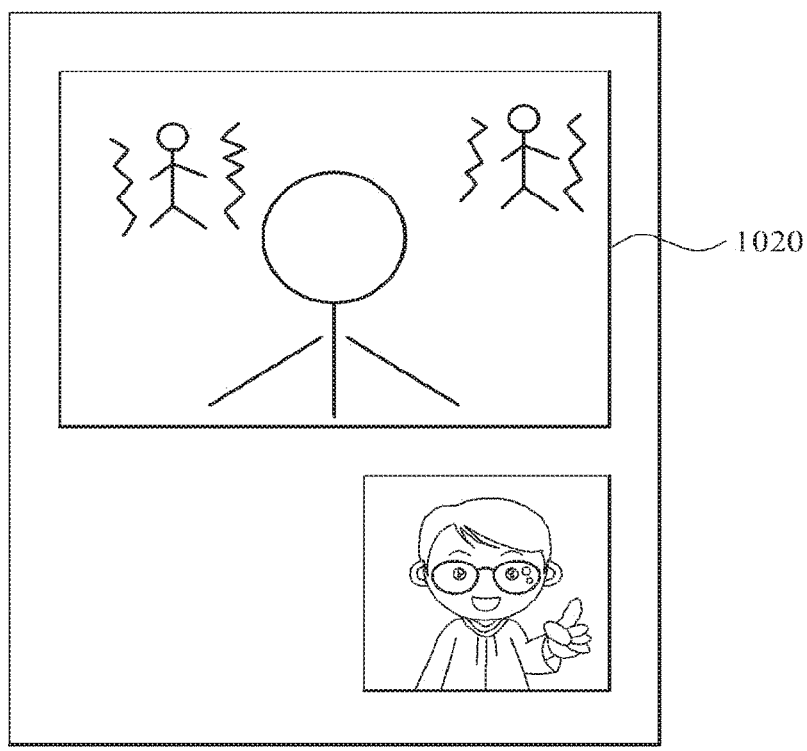

FIG. 8, FIG. 9, and FIG. 10 are diagrams illustrating an example of a display of a mobile communication terminal capable of sharing a display area during a video call according to an exemplary embodiment of the present invention.

Referring to FIG. 8, FIG. 9, and FIG. 10, sharing a memo area during a video call may allow effective and smooth communication between users.

That is, as illustrated in FIG. 8, various memos, pictures, and the like, may be recorded and displayed on a memo sharing area 810 separated from a video area 813. As illustrated in FIG. 9, a picture icon, such as a heart, and the like, may be input to a memo sharing area 910. As illustrated in FIG. 10, a moving icon, and the like, may be input to a memo sharing area 1020, which allows various types of communication.

In this instance, when receiving a UII message during a video call, the memo sharing area may be expanded. Further, the UII message may additionally include terminal control data, such as a vibration, an LED, and the like, and be delivered.

When an initial connection for a video call is made, field data may be exchanged to verify whether the corresponding function may be supported. When the corresponding function is supported, generated data may be constructed by each string. When the generated data corresponds to pen data of a drawing, a run-length compression may be used for a string text to transmit data. A receiving mobile communication terminal may reproduce data through a reverse process, and display the reproduced data on a screen by associating the reproduced data with image data.

FIG. 11 and FIG. 12 are flowcharts illustrating a method of controlling a mobile communication terminal capable of sharing a display area during a video call according to an exemplary embodiment of the present invention. A method of controlling a mobile communication terminal capable of sharing a display area during a video call according to an exemplary embodiment of the present invention will be described with reference to FIG. 11 and FIG. 12.

In operation S1110, first user touch information input to another mobile communication terminal and first image information photographed in the other mobile communication terminal may be received.

In this instance, the first user touch information may refer to data information such as a memo, a picture, and the like generated by a user through a touch screen in a memo sharing area on a touch screen display area, and the first image information may refer to image information photographed through a camera in the other mobile communication terminal.

When receiving a UII message during a video call, the memo sharing area may be expanded, and the UII message may additionally include terminal control data, such as a vibration, an LED, and the like, and be delivered.

In operation S1120, the received first user touch information and first image information may be displayed.

That is, the received first user touch information and first image information may be displayed on a display, and each of the first user touch information and the first image information may be displayed in a separate area on the display.

In operation S1130, second user touch information may be generated by mapping touch information generated through a touch input of a user on the displayed first user touch information.

That is, the second user touch information may be generated by additionally generating data information, such as a memo, a picture, and the like, generated through a touch input of a user on the first user touch information received by the other mobile communication terminal.

The generated second user touch information and first image information may be controlled to be displayed in operation S1140, and the second user touch information may be transmitted to the other mobile communication terminal in operation S1150.

Transmitting of the second user touch information to the other mobile communication terminal in operation S1150 will be further described with reference to FIG. 12.

Second image information may be generated by taking a photograph using a camera in operation S1210, and the second image information may be associated with the second user touch information in operation S1220. That is, an image photographed by a user and a memo or a picture image input by the user may be associated to be provided to the other mobile communication terminal.

The associated second image information and second user touch information may be encoded in operation S1230, and the encoded second image information and second user touch information may be transmitted to the other mobile communication terminal in operation S1240.

That is, the second image information input after being photographed by a camera may be associated with the second user touch information, and be encoded to be transmitted to the other mobile communication terminal.

At the other mobile communication terminal, the second image information and the second user touch information may be decoded using the same scheme used for decoding a general video data, and be displayed on a screen.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electronic device, comprising:
a display comprising an image display area;
a touch-sensitive surface comprising a touch area;
one or more processors; and
memory storing one or more programs configured to be executed by the one or more processors, the one or more programs comprising instructions for:
displaying image data on the image display area, the image data comprising a video;
while displaying the video, receiving touch data representing selection of a graphical representation from a displayed list of graphical representations;
receiving touch data representing a location in the video;
obtaining time information of a time when the touch data representing the location in the video is received;
associating the graphical representation with the image data based on the time information; and
transmitting, to a recipient device, instructions to display graphical representation selected from the displayed list of graphical representations along with the video at a time during a playback of the video corresponding to the time information and at a location in the video determined based on the touch data representing the location in the video.

2. The electronic device of claim 1, the one or more programs further comprising instructions for:
calculating coordinate information about a position of the touch input in the touch area.

3. The electronic device of claim 2, the one or more programs further comprising instructions for:
generating touch data further according to the coordinate information.

4. The electronic device of claim 1, the one or more programs further comprising instructions for:
capturing, via a camera that is a part of the electronic device, the image data.

5. The electronic device of claim 1, the one or more programs further comprising instructions for:
receiving the image data via at least one of a multimedia message service, an email application, an Internet application, an Infrared Data Association module, or a Bluetooth® module.

6. The electronic device of claim 1, wherein displaying the touch data comprises generating the selected graphical representation.

7. The electronic device of claim 1, wherein:
the selected graphical representation is an emoticon, and the list of graphical representations is a list of emoticons.

8. A method, comprising:
at an electronic device with a display comprising an image display area and a touch-sensitive surface comprising a touch area:
displaying image data on the image display area; the image data comprising a video;
while displaying the video, receiving touch data representing selection of a graphical representation from a displayed list of graphical representations;
receiving touch data representing a location in the video;
obtaining time information of a time when the touch data representing the location in the video is received;
associating the graphical representation with the image data based on the time information; and
transmitting, to a recipient device, instructions to display graphical representation selected from the displayed list of graphical representations along with the video at a time during a playback of the video corresponding to the time information and at a location in the video determined based on the touch data representing the location in the video.

9. The method of claim 8, further comprising:
calculating coordinate information about a position of the touch input in the touch area.

10. The method of claim 9, further comprising:
generating touch data further according to the coordinate information.

11. The method of claim 8, further comprising:
capturing, via a camera that is a part of the electronic device, the age data.

12. The method of claim 8, further comprising:
receiving the image data via at least one of a multimedia message service; an email application, an Internet application, an Infrared Data Association module, or a Bluetooth® module.

13. The method of claim 8, wherein displaying the touch data comprises generating the selected graphical representation.

14. The method of claim 8, wherein:
the selected graphical representation is an emoticon, and the list of graphical representations is a list of emoticons.

15. A non-transitory computer-readable storage medium storing one or more programs configured to be executed by one or more processors of an electronic device with a display comprising an image display area and a touch-sensitive surface comprising a touch area, the one or more programs comprising instructions for:
displaying image data on the image display area, the image data comprising a video;
while displaying the video, receiving touch data representing selection of a graphical representation from a displayed list of graphical representations;
receiving touch data representing a location in the video;
obtaining time information of a time when the touch data representing the location in the video is received;
associating the graphical representation with the image data based on the time information; and
transmitting, to a recipient device, instructions to display graphical representation selected from the displayed list of graphical representations along with the video at a time during a playback of the video corresponding to the time information and at a location in the video determined based on the touch data representing the location in the video.

16. The non-transitory computer-readable storage medium of claim 15, further comprising instructions for:
   calculating coordinate information about a position of the touch input in the touch area.

17. The non-transitory computer-readable storage medium of claim 16, further comprising instructions for:
   generating touch data further according to the coordinate information.

18. The non-transitory computer-readable storage medium of claim 15, further comprising instructions for:
   capturing, via a camera that is a part of the electronic device, the image data.

19. The non-transitory computer-readable storage medium of claim 15, further comprising instructions for:
   receiving the image data via at least one of a multimedia message service, an email application, an Internet application, an Infrared Data Association module, or a Bluetooth® module.

20. The non-transitory computer-readable storage medium of claim 15, wherein displaying the touch data comprises generating the selected graphical representation.

21. The non-transitory computer-readable storage medium of claim 15, wherein:
   the selected graphical representation is an emoticon, and
   the list of graphical representations is a list of emoticons.

* * * * *

UNITED STATES PATENT AND TRADEMARK OFFICE
CERTIFICATE OF CORRECTION

PATENT NO. : 10,325,394 B2
APPLICATION NO. : 15/956111
DATED : June 18, 2019
INVENTOR(S) : Sung-Sik Wang et al.

Page 1 of 1

It is certified that error appears in the above-identified patent and that said Letters Patent is hereby corrected as shown below:

In the Claims

In Claim 11, at Column 12, Line 38, delete "age" and insert -- image --, therefor.

Signed and Sealed this
Twentieth Day of August, 2019

Andrei Iancu
*Director of the United States Patent and Trademark Office*